United States Patent [19]

Horn

[11] Patent Number: 4,939,379
[45] Date of Patent: Jul. 3, 1990

[54] CONTOUR MEASUREMENT USING TIME-BASED TRIANGULATION METHODS

[75] Inventor: James N. Horn, Seattle, Wash.

[73] Assignee: Automation Research Technology, Inc., Seattle, Wash.

[21] Appl. No.: 316,811

[22] Filed: Feb. 28, 1989

[51] Int. Cl.$^5$ .......................................... G01N 21/86
[52] U.S. Cl. ........................................ 250/560; 356/1; 356/376
[58] Field of Search ................. 250/560, 561, 227; 357/1, 4, 376, 381, 384–387

[56] References Cited

U.S. PATENT DOCUMENTS

| | | |
|---|---|---|
| 3,255,357 | 6/1966 | Kapany et al. . |
| 3,806,253 | 4/1974 | Denton . |
| 4,097,159 | 6/1978 | Strandberg . |
| 4,158,507 | 6/1979 | Himmel . |
| 4,188,544 | 2/1980 | Chasson ............................ 250/560 |
| 4,192,613 | 3/1980 | Hammar . |
| 4,357,104 | 11/1982 | Davinson ............................... 356/4 |
| 4,541,722 | 9/1985 | Jenks ................................. 356/376 |
| 4,541,723 | 9/1985 | Pirlet . |
| 4,615,615 | 10/1986 | Krolak et al. . |
| 4,634,879 | 1/1987 | Penney . |
| 4,701,049 | 10/1987 | Beckmann et al. . |
| 4,703,177 | 10/1987 | Vieth ................................. 250/227 |
| 4,790,660 | 12/1988 | Ito et al. ............................. 356/376 |

Primary Examiner—David C. Nelms
Attorney, Agent, or Firm—Patrick M. Dwyer; David L. Garrison

[57] ABSTRACT

The invention relates to the field of non-contact surface contour measurement by triangulation of reflected radiation from the surface. More particularly, the invention relates to a system for gathering x, y, z data points with respect to the surface contour of an object by means of time based triangulation methods.

12 Claims, 6 Drawing Sheets

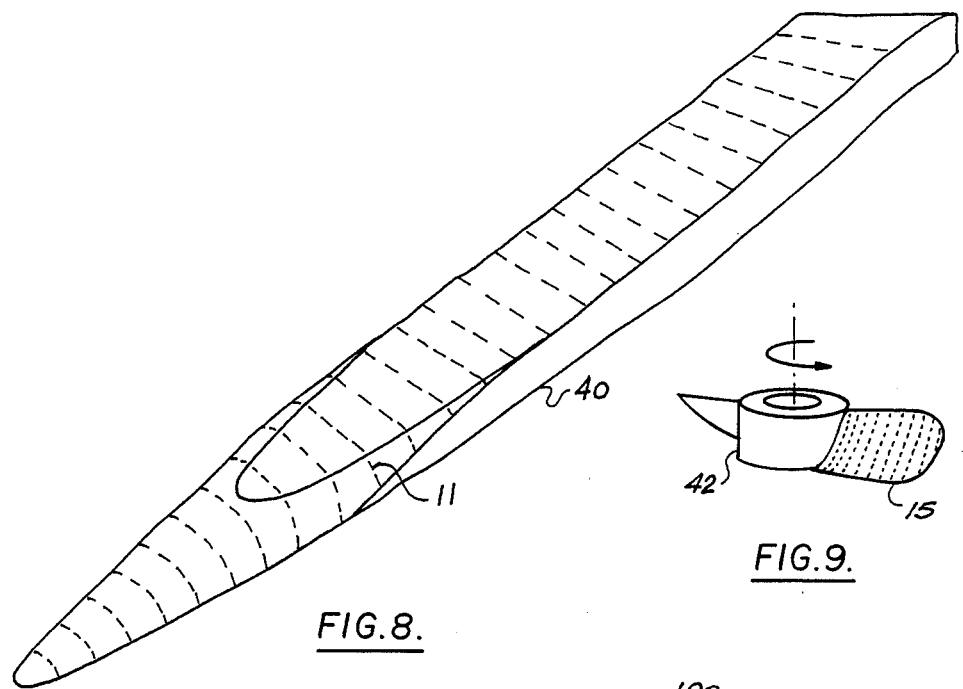
FIG.8.
FIG.9.
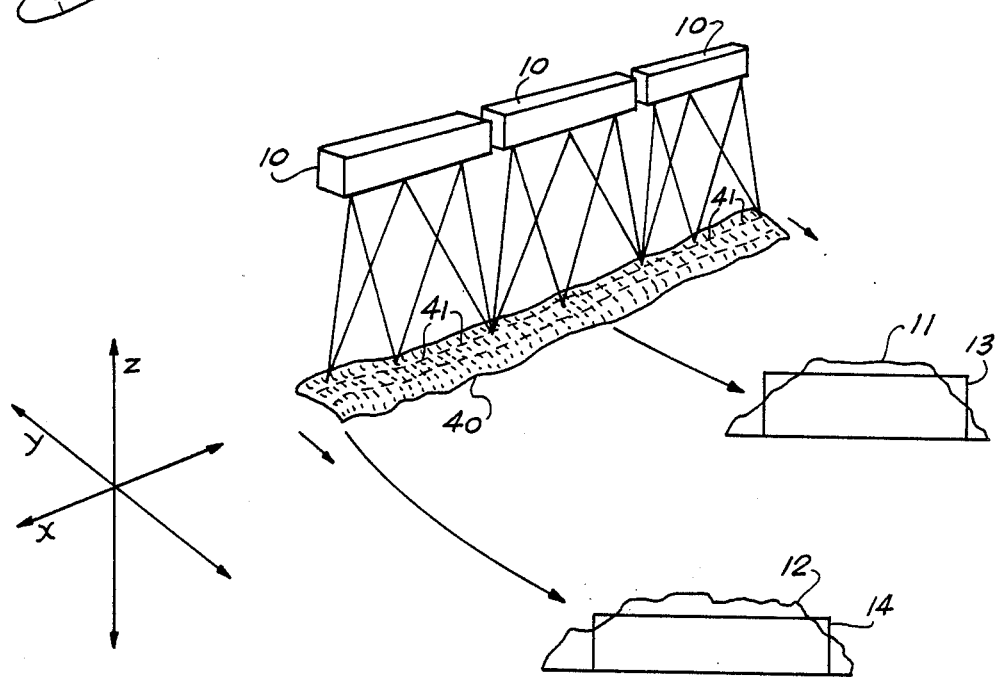
FIG.10.

CONTOUR MEASUREMENT USING TIME-BASED TRIANGULATION METHODS

BACKGROUND OF THE INVENTION

The need in many industries to make determinations based upon knowledge of the surface contour of an object is well known. Moreover it is most often necessary to make measurements to the surface contour of the object without making contact with the surface of that object, hence the term: non-contact surface contour measurement. Various conventional non-contact surface contour measurement systems which employ a scanning beam of radiation, and particularly coherent optical light as from a laser, have been described. Reference is made to U.S. Pat. No. 4,158,507 to Himmel (1979) and to U.S. Pat. No. 4,701,049 to Beckmann et al. (1987). These disclosures and the references summarized therein together with U.S. Pat. No. 4,634,879 to Penney (1987), and the references summarized therein describe the general elements of such a contour measurement system employing a scanning beam of radiation or light.

Beckmann et al. is particularly concerned with improvements related to elimination of interference by "false reflections" from points outside of the plane of the scanning beam, while Himmel describes an alternative reflection detection system for measuring relative changes in contour slope, the system employing an optical grating through which the reflections are sensed by a photomultiplier detector. Although various methods of optical triangulation of a reflected coherent light beam are disclosed and computations appear to be made which involve both the measurement of angles and of certain time related functions, none of the known systems provide a simple, highly accurate, time based triangulation measurement system which can be virtually impervious to the problem of reflection aliasing within the plane of the scanning beam itself.

In general, the phenomenon of aliasing, the occurrence of which is well known in the art, is involved wherever a reflection detection point cannot discriminate between reflections received from different scanning beam angles reflecting from differing countour heights. This problem is inherent, for example, in the measurement system proposed by Himmel (U.S. Pat. No. 4,158,507), partially illustrated in schematic in FIG. 1. Schematically illustrated optical grating 2 has typical light receiving "windows" p, q, r, s defined by adjacent light opaque grating bars. Each window is necessarily focused to view a spot of light reflected from a particular reflection point on a surface beneath it. The exact height and location (z, x) of any particular reflection point will depend on the height of the reflection surface at its intersection with the line of focus of the particular window. Thus, in FIG. 1, windows p, q, r, s are focused respectively, where the surface contour is represented by the line h=O, on points a, b, c, d. In the system proposed by Himmel, contour slope is determined by the dimension and uniformity of spacing of the points a, b, c, d. Thus, given suitable calibration, the system illustrated in FIG. 1 will read contour h=O as flat and level.

However, for an alternate contour represented in the figure by the dotted line below h=0, having reflection points a', b', c' with respective actual contour heights at those points of $h_1$, $h_2$, and $h_3$, the beam angle which would have produced a reflection at point a now reflects from a', and the beam which would have reflected from point b now reflects from b', and so forth. But window q, which was aimed to receive a reflection from b at one beam angle, can also receive a reflection a' at a different beam angle. Similarly, windows r and s can each receive reflection from both c and b' and d and c', respectively.

Thus, the Himmel system cannot distinguish between contour surface h=O and the surface represented by dotted line, and consequently would read either surface as flat and level. In the illustration of FIG. 1, reflection from a' becomes an alias for reflection from b, reflection from b' becomes an alias for reflection from c, and so forth. In fact, because in the system proposed by Himmel greater resolution is achieved by greater grating densities, the amount of height difference between h=O on the one hand and $h_1$, $h_2$, or $h_3$, on the other need only be very small to introduce the kind of aliasing error described above.

Accordingly it is an object of the invention to provide apparatus and methods for an improved non-contact surface contour measurement system using time based triangulation methods, the accuracy of which measurements is not diminished by the aliasing phenomenon.

Furthermore none of the known systems employ a reflected light receiving surface which acts as a light channeling surface such that reflected light is received at a given instant in time by one of a plurality of light feeder optical fibers, which plurality of optical fibers have been divided and bundled into one or more light receiving channels, whereby light is received in only one of the channels at any particular moment of time, which time correspond to the appearance of the reflected light at a particular optical fiber.

It is therefore a further object of the invention to provide a structure for a light channeling surface and associated light receiving channels.

DISCLOSURE oF THE INVENTIoN

These and other objects of the invention which will become apparent to those skilled in the art are accomplished by the means and in the manner set forth further herein. The invention comprises both systems of apparatus for the gathering of x, y, z data points with respect to the surface contour of an object and methods of calculating absolute height values for these x, y, z points with respect to one or more reference height levels by means of time based triangulation methods.

In general, the measurement system of the invention comprises a radiation emitting source and a radiation guiding means which cooperate to produce a scanning beam of radiation directed in a line across the surface of an object. Preferably, the radiation emitting source is an optical quality low power laser and the radiation guiding means is a polygonally lobed spinning mirror oriented such that all of the laser reflection angles from the lobes of the spinning mirror and the emitted beam from the laser all lie in the same plane. In the measurement system of the invention the scanning beam thus created produces what appears to the naked eye to be a line of light across the object, at least where a rapidly spinning mirror is employed.

The system of the invention further comprises a radiation receiving means which is preferably an optical lens system mounted and aimed to view the line projected upon the object by the scanning beam. The light receiving means gathers the diffuse reflectance of the scanned line upon the object and focuses it behind the lens upon a signal producing radiation sensitive detector array which is preferably a light channeling surface designed to have reflected and focused upon it at a particular one of its light feeder optical fiber ends a point of reflection of the scanning beam at a moment in time. Preferably the signal producing radiation sensitive detector array comprises one or more photodetectors, such as a photodiode or photomultiplier which is capable of converting a pulse of received light into a signal, preferably an electrical signal. The detector array is further comprised preferably of one or more bundles of light feeder optical fibers each of which bundles is assigned to its own photodetector. The individual optical fibers of each bundle are in turn conveyed to the light channeling surface in a substantial linear arrangement such that each light receiving channel consisting of a photodetector and its bundle of light fibers is represented in alternating sequence on the light channeling surface by an end of one of its optical fibers. Thus as the scanning beam of light in a preferred embodiment moves from one angle, with its associated reflection point on the object, to other angles each with their associated reflection points on the object, the moving image of those reflection points on the object moves successively across the ends of the optical fibers on the light channeling surface.

The system of the invention also comprises signal processing equipment and data processing equipment consisting of both hardware and software selected from amongst equipment well known in the art and arranged in any of a number of ways well known to those skilled in the art in order to process the signals from the photodetectors of the receiving means and correlate them with the positional and time related data generated by the system as is more fully disclosed below. The system of the invention includes within the above described equipment a well known type of timer from which various time values are receiving and processed as data in accordance with the method disclosed below.

A method of the invention requires that an object be placed upon an inspection surface which is preferably movable in any of several ways well known in the art and aligned in a such a way that the scanning beam of light produced by the system runs substantially the full length of the object. Since in one application of the invention, various kinds of lumber and saw mill products have their surface contours read by the system of the invention, the object which is to be scanned will be referred to as a matter of convenience as a cant of lumber. The cant is brought by conventional rollers to a position where the cant is correctly oriented beneath the scanning beam so that the beam scans a substantially longitudinal dimension of the cant. In further refinements of the invention, means are also provided to move the cant orthogonally to the scanning beam so that a series of contour lines are scanned across the cant and read as x, y, z data points in order to plot the contour of the cant for instantaneous use by numerical controlled equipment in the lumber mill to maximize the commercial yield of a particular cant.

As the scanning beam of the system sweeps through an angle to move a scanning spot from one end of the cant to the other, which swept angle is generated by the movement of a lobe of the polygonal spinning mirror moving through an arc which begins by passing a leading edge of the lobe into the line of the laser beam and ends by drawing a trailing edge of the lobe out of the line of the laser beam, the instantaneous angle of the scanning beam is made known by positioning a start sensor to catch the scanning beam at a fixed and known angular position before the beam begins to sweep the longitude of the cant. The start sensor in turn triggers the timer from which time values are then read as needed.

The optical lens and light channeling surface and light receiving channels of the receiving means, having been previously aligned and aimed at the object in such a way that the scanned line is focused as a reflected image substantially coincident with the linear array of optical fiber ends on the light channeling surface, has therefore got each of its light fiber ends aimed along specific particular angles at the scanning line travelled by the scanning beam on the object. Where the object is a known reference surface of known height, the aiming angle of each of the optical fibers of the light channel surface to the reference surface can be known and the reflection of the scanning spot will be focused and moved along the light channeling surface and across each of the optical fibers in turn at known times from the timer, according to the height of the known reference surface. These known times are taken for two or more reference heights to establish a range of known times related to known reference heights at which reflected light will strike a particular optical fiber.

The simplest form of time based triangulation for a cant is effected then by passing the scanning spot along the scan line projected on the cant in such a way that the corresponding reflection spot image on the light channeling surface strikes each optical fiber in turn, but at times different than the times at which the reflection spot struck the fiber when reflected any of the known reference heights. In its simplest terms, a measured time value will necessarily fall between the time values for a known minimum reference height, and a known maximum reference height, and a surface contour height may be read from the look up table for that fiber by scaling the time value between the minimum time value and the maximum possible time value and making a linear approximation as to the correlation in scaling of surface height between the minimum known reference height and the maximum known reference height. This method is at its simplest and most accurate, and is impervious to aliasing, where a plurality of optical fiber ends are each associated with its own photodetector, as for instance having a light channeling surface with twenty-one optical fibers, each of which is associated with one of twenty-one photodetectors.

In most applications however the need for such accuracy cannot justify the cost of the relatively expensive photodetectors, and associated signal and data processing equipment for each detector, and the invention contemplates an effective compromise between performance and accuracy and cost effectiveness That is, a relatively fewer number of photodetectors are employed for a given number of optical fibers, where the number of the optical fibers are chosen dependent upon the desired spacing or density of the measured contour points along the cant. For instance typical cant measurements do not require a contour measurement closer than every three inches longitudinally along the cant, so that twenty-one optical fibers may be employed to read approximately five feet of cant with the desired three inch contour spacing. Instead of providing a photo detector for each optical fiber however, the optical fibers are bundled and divided as above described into relatively fewer light receiving channels each with its own associated photodetector.

In one application twenty-one optical fibers are divided into three light receiving channel bundles, each associated with one of three photodiodes. In this kind of embodiment, it is apparent that a given photodiode at any given moment does not necessarily know from which one of its seven optical fibers it has just received a light pulse. However since the light fibers are arranged on the light channeling surface in successive alternation with respect to each of the light receiving channels, any given photodiode receives a pulse of light only once out of every three successively illuminated light fiber ends. When the number of optical fibers and light channels has been chosen with due consideration of the expected range of surface height measurements, the known viewing angle of the receiving means lens system with respect to a reference surface, and the desired density of contour measurements, it can be anticipated that the range of time values for the look up tables of each succeeding light fiber will not overlap the range of time values for the next succeeding optical fiber. Thus when a photodiode receives a pulse of light at a time read from the timer, which timer is reinitiated at the beginning of every scanning beam sweep, that read value will appear in only one of the look up tables of all the optical fibers associated with that photodiode and it will be from only that one table that the corresponding scaled surface height data point is taken. In some limited applications, a single light receiving channel may be employed where limited accuracy is acceptable. Generally, one channel will serve where contour spacings need be measured no closer than 3½ inches apart, range of height measurements are 0–6 inches of cant thickness, and worst case viewing angle is 60 degrees.

In a refined method of the invention every time minimum and time maximum in each look up table can be associated with the known scanning beam angle, determined trigonometrically from the known rotational speed of the spinning mirror and the known elapsed time from the start sensor which is fixed at a known angular position, and thus greater accuracy still may be achieved by converting the read value of the timer at the point when the reflected spot image from the cant surface strikes a particular optical fiber into a beam angle in the manner just described, and then computing the change in surface height from the reference height by using the known geometries.

Other refinements are contemplated such as the use of a beam angle end sensor as a correction in variations in the rotational speed of the spinning mirror so that where scanning beam angles must be precisely known, the precise speed of rotation at a given instant can be computed. Furthermore since each lobe of a typical polygonal spinning mirror, which in a preferred embodiment is an eight sided spinning mirror, will have slightly different optical or reflective properties, it will be appreciated that a different set of look up table values for each given reference surface can be created for each of the eight lobes of the mirror to provide more accurate x, y, z data points. Accordingly means are provided for discerning which lobe of the spinning mirror is producing the scanning beam at any particular moment. One effective way of doing this is to render the leading edge of an arbitrarily chosen lobe non-reflective, as by black paint or black non-reflective tape, and to use an additional sensor placed antirotationally with respect to the start sensor so that this lobe sensor receives a pulse from the scanning beam as the scanning beam from every lobe passes it except for the lobe with the darkened leading edge. Data processing can then distinguish that the lobe which produces no pulse is the zero or reference lobe and every successive lobe until the return of the reference lobe is counted from that reference lobe and thus uniquely identified.

Convenient means of focusing and aligning the light channeling surface of the receiving means with respect to the scanning line are also contemplated in the form of means to send light through one particular light channel in the reverse direction of the scanning and receiving mode so that each optical fiber of a particular light channel projects a small beam of light through the lens system of the receiving means down onto the cant or onto a reference surface so that it may be readily discerned where the receiving means is aimed and adjustments thereby made. In one embodiment this is accomplished by providing a separable connection within a particular light channel which can at need be connected to a separate source of intense coherent light or the laser light itself, as for instance disconnecting an optical fiber from the start sensor and connecting it to the light receiving channel bundle for the light channel to be aimed.

BRIEF DESCRIPTION OF THE DRAWINGS

FIG. 8 is an isometric view of a typical object measured by the invention with schematic representations of contour lines illustrated as broken lines.

FIG. 9 is an isometric view of an alternative object as measured by the invention with schematic representation of contour lines shown as broken lines.

FIG. 10 is an alternate embodiment of the invention illustrating three of the units of FIG. 7 cooperating to measure a longer object with schematic representations of contour lines and typical cross-sectional contours.

BEST MODE FOR CARRYING OUT THE INVENTION

Figure 2:
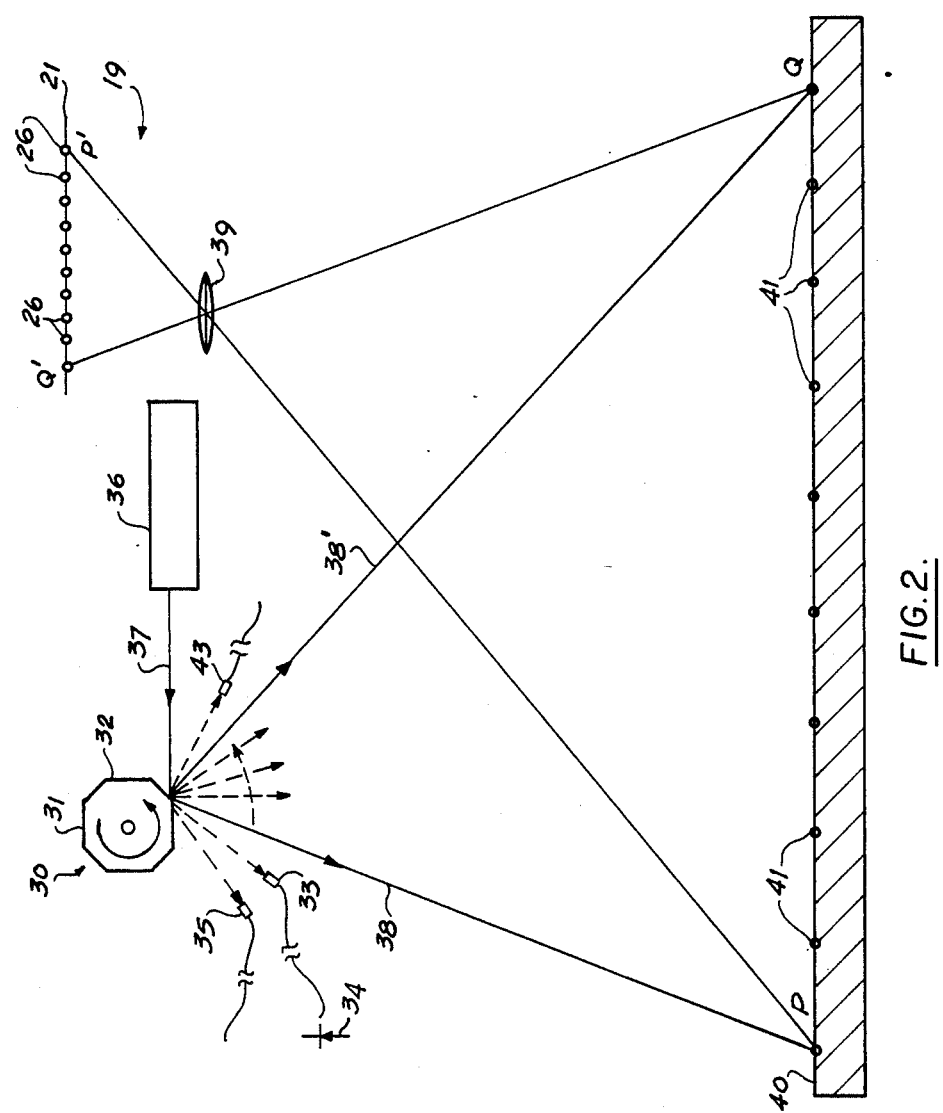
FIG. 2 is a schematic representation of a side elevation of one embodiment of the system of the invention.

Referring now to the drawings wherein like numbers indicate like parts, a number of the embodiments of the measurement system of the invention and the methods of timed based triangulation of the invention are more particularly described by way of illustration of the invention. FIG. 2 is a schematic side view of one embodiment of the contour measurement system of the invention. Laser 36 emits laser beam 37 which is reflected by the lobes 31 of spinning mirror 30 shown rotating in the direction of the arrow in the figure. This in turn produces scanning beam 38 which moves from a position shown generally at 38 to a position shown generally at 38' before repeating the scanning sweep with the next lobe of spinning mirror 30. Scanning beam 38 impinges upon the surface of lumber cant 40 to produce, among a series of other reflection points, scanning spot reflection points 41 along the scanning line produced by scanning beam 38 on cant 40. In this embodiment a He-Ne Class 3A optical laser of a power rating of less than 5 milliwatts is employed with a rotating eight lobed mirror from Lincoln Laser, Phoenix, AX, Model No. M-660-010-LVWOB.

The start of the sweep of scanning beam 38 is detected by start sensor photodiode 34 and the end of the sweep of scanning beam 38 is detected by end sensor 43. Sensors 34 and 43 can be any photosensitive device capable of producing a signal to trigger the start or stop of a suitable timer, such as preferably a Motorola MFOD71 type photodiode connected to a light receiving point by an optical fiber such as at 33. A timer of the oscillating type which is then digitally counted has been found suitable. Similarly the end sensor 34 triggers a final reading from that particular run of the timer and resets the timer to zero. The rotating mirror apparatus has means to provide a direct digital readout of its rotational speed, but the time it takes for scanning beam 38 to sweep from start sensor 33 to end sensor 43 is used as a check on the instantaneous rotational speed of the mirror during that sweep. In addition, as each of the eight lobes of the mirror will have slightly different reflective properties, leading edge 32 of one lobe is rendered nonreflective as by a piece of flat black tape or paint and a lobe sensor 35 is employed in a position antirotational to the start sensor such that the leading edge of every lobe but the nonreflective leading edge will reflect laser beam 37 into lobe sensor 35 and produce a telltale pulse, the absence of which, as leading edge 32 passes the corresponding reflection position, identifies that lobe as the reference lobe from which all of the other lobes are counted and identified in rotational succession.

Figure 1:
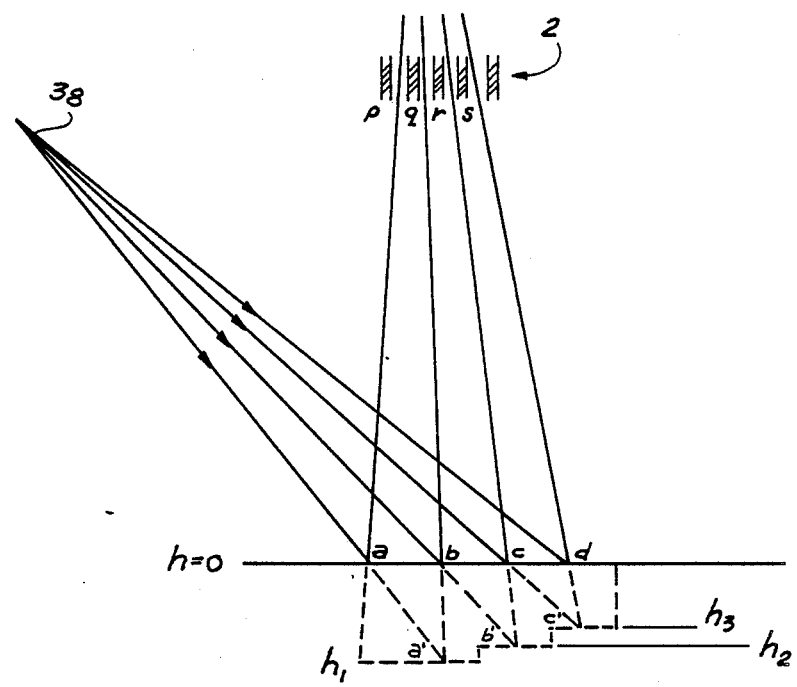
FIG. 1 is a schematic representation of reflection aliasing which can occur in prior art systems.
Figure 3:
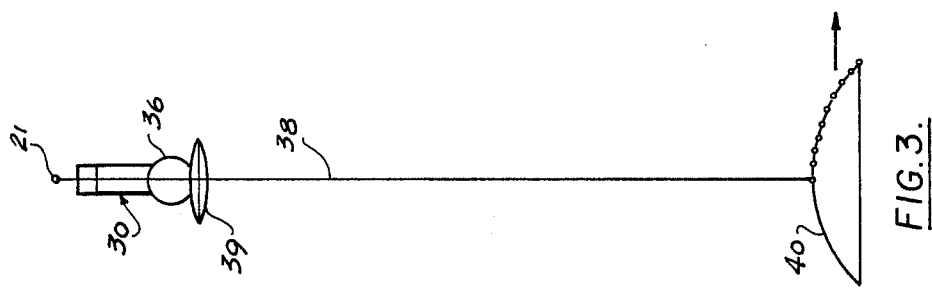
FIG. 3 is a schematic end view of the system shown in FIG. 2.

Camera 19 is generally shown schematically having lens system 39, light channeling surface 21, with light reflection receiving points 26. A conventional 50 millimeter camera lens from Canon has proved satisfactory and is aimed at an angle to the cant 40 to receive the diffuse reflected image of the scanning line composed of successive reflection points 41 and is aligned to focus the reflected image of that line substantially coincident upon light channeling surface 21. Thus the scan spot P on lumber cant 40 is reflected upon light channeling surface 21 as reflection point P' and scan spot Q is likewise focused as reflection point Q' on light channeling surface 21. While light channeling surface 21 need not be in the same plane as laser beam 37 and scanning beam 38 because what light channeling surface 21 receives through lens system 39 is diffuse reflectance and not spectral reflectance, preferably light channeling surface 21 and lens system 39 are aligned so that they do reside in the same plane as the sweep of scanning beam 38 in order to minimize signal to noise ratio and the necessity for selective gain compensation. This coplanarity is illustrated in FIG. 3. Additionally FIG. 3 illustrates the orthogonal movement of the measured object 40 in the direction shown by the arrow at the bottom of the figure in order to create contour lines from a series of closely spaced measured points as scanning beam 38 sweeps the object longitudinally while the object is in motion orthogonally to the plane of the scanning beam.

Figure 4:
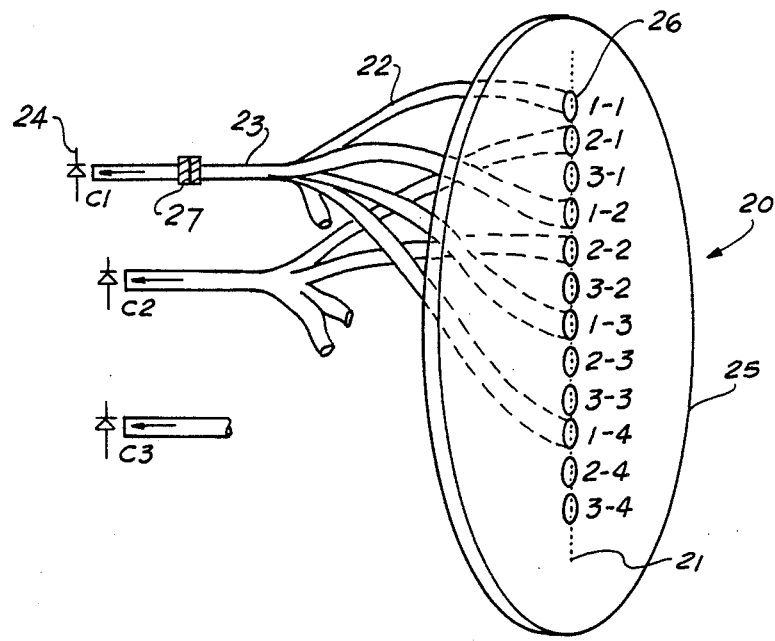
FIG. 4 is a schematic quasi-isometric partial view of one embodiment of a light channeling apparatus of the invention.

In FIG. 4 one embodiment of the light channeling system behind the lens system 39 in camera 19 is depicted in partial schematic for ease of illustration. Plastic disk 25 has drilled therein along a substantially linear alignment a series of precise holes precisely spaced for receiving a series of optical fibers 22. After optical fibers 22 are received in the holes and glued in place they are then cut off at the surface of disk 25 and optically polished to produce light reflection receiving points 26 along the line of light channeling surface 21. It is the image of the reflected scan spots on object 40 which are focused on this surface along this line. Thus the reflection of laser scanning beam 38 as it passes longitudinally along object 40 is focused to pass over each successive light reflection receiving point 26, thus passing light successively into each light feeder 22. In this embodiment consisting of twelve light feeders 22, three light channels or bundles 23 of four light fibers 22 each are routed each to a photodetector 24 which is preferably a photodiode of the same type as the earlier described photodiodes, but which may be any conventional photodetector, such as a photomultiplier tube, though typically prohibited by cost considerations. The bundling of light fibers 22 into light channels 23 is not haphazard but is chosen as illustrated in FIG. 4 so that light channel C1 contains light fibers 22 leading to light reflection receiving points 1-1, 1-2, 1-3, and 1-4. Similarly light channel C2 has light fibers 22 chosen to lead to light reflection receiving points 2-1, 2-2, and so forth. In this way the reflected scan spot moving along light channeling surface 21 crosses one optical fiber at a time and thereby inputs light first into one light receiving channel C1, then into the next light receiving channel C2, and finally into the third light receiving channel C3, before light receiving channel C1 again receives light through the next successive fiber.

Photodetectors 24 are connected to suitable signal processing equipment for determining which portion of the focused reflected moving spot on light channelling surface 21 will cause the appropriate signal pulse. For examples, the signaling processing equipment may be so calibrated and adjusted that the leading edge of the spot causes the signal to register, or the peak value of the light intensity received at the photodetector may be used as the signal trigger.

Also schematically illustrated in FIG. 4 is channel connector 27 which can be any selectably disconnectable well known optical fiber bundle connector. In one embodiment, optical fiber 3 (FIG. 2) also has a connector (not shown) at some suitable position along its length to photosensor 34, such that fiber 33 may be selectively connected to optical bundle 23, whereby pulses of laser light received at the fixed end of fiber 33 are transmitted through light channel 23 and shine out of fiber ends 1-1, 1-2, 1-3 and so forth. These separate fiber beams are focused by lens 39 in reverse upon a reference surface (not shown) to check, and if necessary, align the viewing angle and positioning of camera 19. In this way individual fiber angles may be measured and known.

Figure 7:
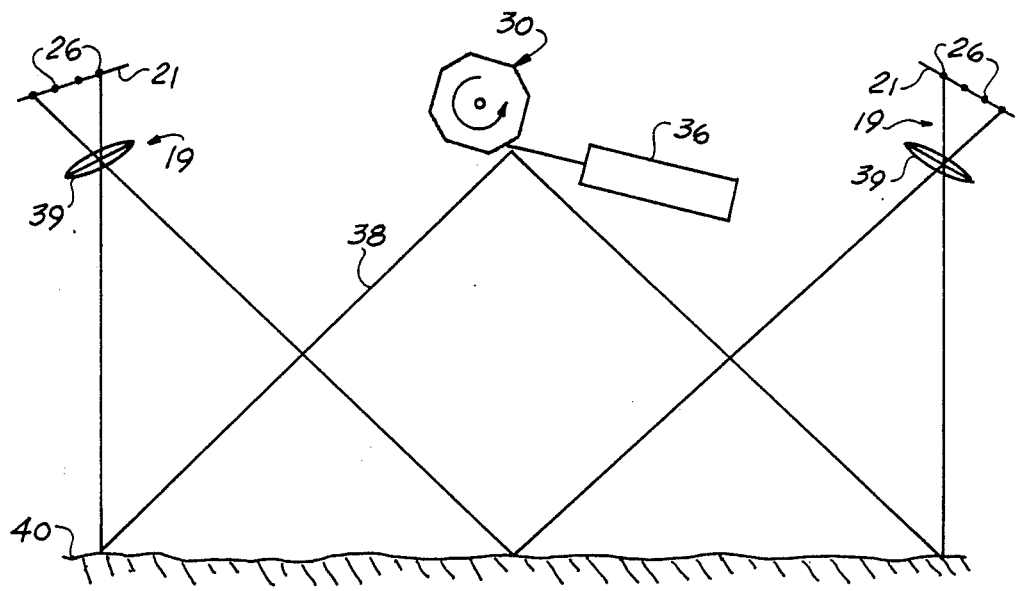
FIG. 7 is a schematic representation of an alternate embodiment of the system of the invention to that shown in FIG. 2.

In FIG. 7 an alternative embodiment of the measuring system of the invention is schematically represented in side view wherein dual cameras 19 each having lens systems 39 and light channeling surfaces 21 with light reflection receiving points 26 are disposed on either side of a scanning beam generating means consisting of laser 36 and spinning mirror 30 together with other components as generally illustrated in FIG. 2. Scanning means are arranged such that a scanning beam 38 is swept from one extreme of the measured object 40 to the other in an arc bounded for the most part by the outward positions of the two cameras 19. Placing the two cameras 19 in this position requires each camera 19 respectively to view only half of the scan spot line on object 40. If the height of cameras 19 is selected to be the same as in the embodiment of FIG. 2, then the scan spot line is viewed from a steeper angle and thereby minimizes aliasing without at the same time proportionally increasing the cost of the system, in that the most expensive parts of the system are the laser and spinning mirror. However, employing twin cameras per scanning system also permits an overall system height reduction to bring both of the cameras approximately one third closer to object 40, while at the same time measuring an approximately one third greater object length. Thus the intensity of reflected light received on light channeling surfaces 21 is increased by as much as 30%, and fewer systems need be employed together to measure a given length of cant. In the two camera embodiment depicted in FIG. 7, a light channeling system involving two light receiving channels, or bundles, of seven optical fibers each, each channel leading to one of two photodiodes is employed, as compared to the embodiment depicted in FIG. 2 wherein, because of either the shallower average viewing angle or the typical greater height of lens system 39, a light channeling system comprised of three light channels of seven optical fibers each leading to one each of three photodiodes is employed It will be appreciated that the embodiment in FIG. 7 represents an increase in accuracy and resistance to aliasing, and preferably an increase in received signal strength, signal to noise ratio, and background rejection, while increasing the cost of the system only by the cost of the relatively less expensive additional lens system 39 and one additional photodiode.

FIG. 10 is a representation of three double camera systems 10, each of which is depicted in greater schematic detail in FIG. 7 placed end to end for scanning twenty foot cant 40. Also illustrated are measurement directions x, y, z. Typical y, z contour lines produced are schematically represented and shown illustratively in cross-section at 11 and 12 superimposed cross-sections 13 and 14 of ideal finished lumber sizing which might be cut form cant 40 at the respective contour locations of 11 and 12. Typical x, z contour points are also illustrated.

FIGS. 8 and 9 illustrate alternative types of objects 40 and 42 which might have their surface contours measured using the measuring system of the invention. In FIG. 8 a lumber cant 40 has contour lines 11 measured for use in the lumber cutting industry. In FIG. 9 a propeller 42 has contour lines 15 measured as the propeller is slowly rotated, in the direction shown by the arrow in the figure, beneath the scanning beam of the measuring system of the invention.

Figure 5:
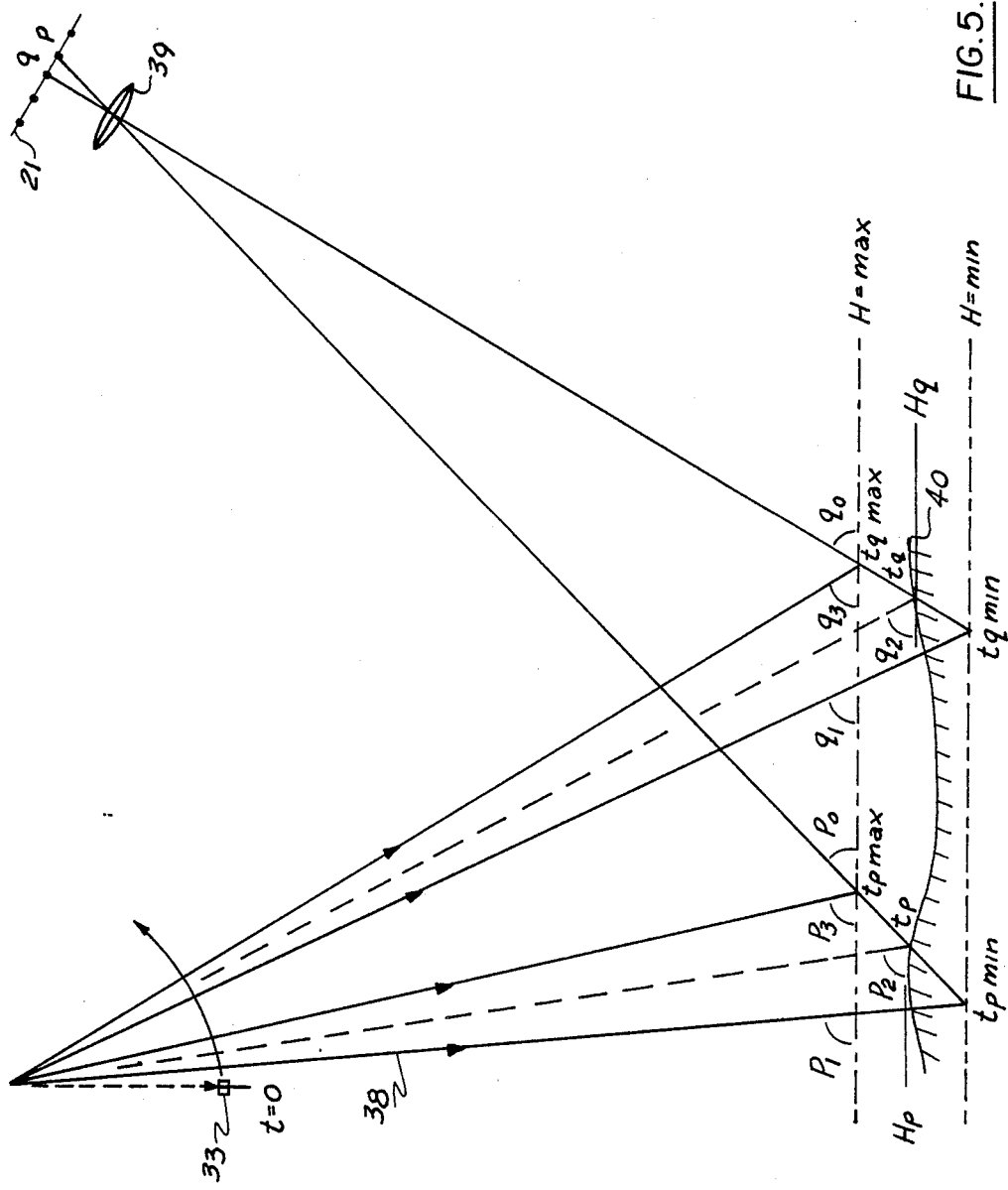
FIG. 5 is a schematic representation of two successively received reflections from an object surface in partial illustration of the method of the invention.

The method of the invention may be understood in part by reference to FIG. 5 which illustrates that each of two representative fibers p and q on light channeling surface 21 have known angles $p_0$ and $q_0$ respectively as those fibers are focused through lens 39 either onto reference surface H=max or reference surface H=min or upon a contoured surface of an object 40, the surface of which is schematically shown in cross-hatching in the figure. For each reference height H=max or H=min, each fiber q or p has a known $t_p$ max or $t_q$ max and $t_p$ min or $t_q$ min, where t represents the time at which scanning beam 38 strikes the respective surface at the point at which the fiber q or p is focused, and where t=O at the point at which scanning beam 38 crosses start sensor 33 and then moves in an arc in the direction shown by the arced arrow in the figure. For any given set of reference surface measurements prepared prior to measuring an object 40, every fiber q or p has created and stored a look up table such as that illustrated in Table 1 below containing the values of the expected arrival times of the reflected light on respective fibers q and p from both minimum and maximum reference heights.

TABLE 1

| p | | q | |
|---|---|---|---|
| $t_p$ max | H = max | $t_q$ max | H = max |
| $t_p$ | $H_p$ = ? | $t_q$ | $H_q$ = ? |
| $t_p$ min | H = min | $t_q$ min | H = min |

When an object contour surface 40 having contour values or height values generally within the range between H=max and H=min is scanned by beam 38, the time of arrival of the reflected light at fibers q and p respectively, assuming movement of the scanning beam in the direction shown by the arced arrow of the figure, is something less than $t_q$ max, but something greater than $t_q$ min for fiber q, and something less than $t_p$ max, but greater than $t_p$ min for fiber p.

Supposing for ease of explanation that fibers q and p feed separate light channels and corresponding photodetectors, scanning beam 38 striking surface 40 to intersect the viewing angle of fiber p will do so at time $t_p$ which, in the simplest mode of the method of the invention, is converted to a surface height $H_p$ by simple arithmetic linear scaling between $t_p$ max and $t_p$ min.

It will be appreciated of course that where greater accuracy of surface height values will be useful, $t_p$ may be converted into a scanning beam angle $p_2$ and compared with known scanning beam angles $p_1$ and $p_3$ to arrive geometrically at an exact surface height $H_p$ by well known calculating methods.

It will be appreciated that greatest accuracy and minimum aliasing problems can be achieved simply by use of one photodiode for every light fiber, or in other words, every light receiving channel having only one light fiber. In this way every time light is received in a light receiving channel it is always unambiguously known quite simply which light fiber and therefore which light fiber angle received the reflected light. However the expense of a multiplicity of photodetectors and associated signal processing equipment, when evaluated against the ability to adequately select a number of light channels to avoid aliasing, generally precludes the more costly use of individual photodetectors for each light fiber.

Figure 6:
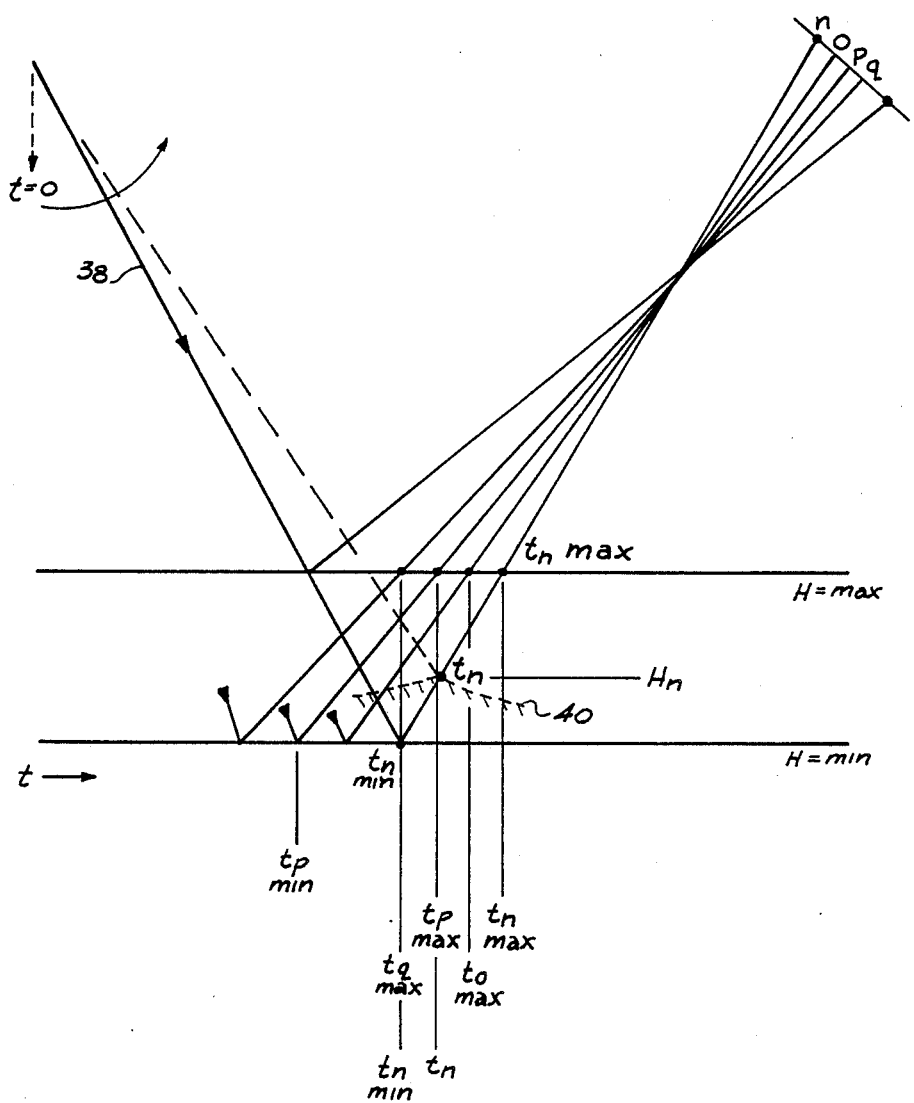
FIG. 6 is a schematic representation of the considerations involved in avoiding aliasing with the invention.

In practice it has been found that for relatively steep viewing angles two light receiving channels with enough optical fibers each to cover the desired length of object at the desired contour interval spacing are adequate, while three light receiving channels will be required for shallower viewing angles such as for the embodiment depicted in FIG. 2. FIG. 6 depicts a potential aliasing situation and illustrates schematically some of the concerns which need to be addressed in the choice of the number of light receiving channels to be used to avoid aliasing. These factors include the average viewing angle of the camera lens system, the expected range of surface height measurements, and the desired density of the spacing of the contour measurements. FIG. 6 illustrates an average viewing angle approximating forty-five degrees with a rather great range of potential height measurements and a moderately dense or closely spaced contour measurement arrangement. The dimensions of FIG. 6 are only relative and illustrative; nevertheless it can be seen that, as in FIG. 5, every light fiber n or p has its maximum and minimum time values in its look up table and the actual time of arrival of a reflected spot upon a contour surface 40 may be in between those maximum and minimum times for any one of the fibers. In fact, as shown in FIG. 6, there can be a $t_n$ somewhere between a $t_n$ min and a $t_n$ max which happens to fall at the same time as the $t_p$ max for successive fiber p. Thus for instance if fibers n and p both feed the same light channel, that light channel could have received a light reflection at the exact same time for either fiber n or p, and thus give an ambiguous height value, as the channel is thereby unable to discern which fiber actually received the light reflection. Looking at FIG. 6 in another way it can be seen that the t max for each of fibers n, o, p, and q fall ahead of the minimum expected time $t_n$ min for fiber n. Thus there are three possible time value overlaps between fibers n, o, p, and q. This kind of illustration is helpful in planning to use either a less dense contour measurement, a smaller range of height values, or a shallower viewing angle, or a combination of these three factors, or else resolving to employ a number of light channels equal to or greater than the number of anticipated time value overlaps. FIG. 6 illustrates the need for at least three and probably four light channels With multiple light channels, look up tables as described above are then created for every fiber of every channel. Multiple channels permit overlap of time values in look up tables for adjacent fibers so that contour spacing may be relatively dense for greatest resolution, while at the same time ensuring that no range of value in a look up table for one fiber of a particular channel will overlap the values of a table for another fiber of the same channel. In this way, light received at a particular time value in a given channel may be uniquely identified with a particular fiber, and hence a known reflection angle.

In compliance with the statute, the invention has been described in language more or less specific as to structural features It is to be understood, however, that the invention is not limited to the specific features shown, since the means and construction shown comprise preferred forms of putting the invention into effect. The invention is, therefore, claimed in any of its forms or modifications within the legitimate and valid scope of the appended claims, appropriately interpreted in accordance with the doctrine of equivalents.

I claim:

1. In a non-contact surface contour measurement system having radiation emitting and guiding means to produce a scanning beam of radiation, radiation receiving means to receive a reflection of said scanning beam from the surface of an object to be measured and to focus said reflection upon a signal producing radiation sensitive detector array, and signal processing and data processing means to convert scanning beam positional data from said radiation emitting and guiding means and from said detector array to contour plotting data points, the improvement comprising:

a radiation channeling surface acting as the front stage of said radiation sensitive detector array; and
one or more signal producing radiation receivers acting as the rear stage of said radiation sensitive detector array;
wherein said channeling surface comprises a substantially linear array of the radiation receiving ends of a plurality of radiation feeders, each for conducting said reflected radiation to a radiation receiver, and
wherein each of said radiation receivers is coupled by a set of said radiation feeders to said radiation channeling surface to comprise a single receiving channel in such a way that successively numbered receivers and their associated channels are connected to successively positioned feeders in their linear array on the channeling surface in sequential alternation.

2. The system of claim 1 wherein said radiation is in the optical range of light, each of said radiation receivers is a photodiode, said radiation feeders are light transmitting optical fibers.

3. The system of claim 2 further comprising a plurality of photodiodes each connected to a separate bundle of a plurality of optical fibers to comprise separate light receiving channels arrayed on the light channeling surface.

4. The system of claim 3 wherein said plurality of photodiodes is three and said plurality of optical fibers is seven.

5. The system of claim 3 wherein said light emitting means comprises an optical laser and said light guiding means comprises a rotating polygonal mirror and wherein said scanning beam positional data comprise rotational mirror speed readout and time data from a timer actuated by a scan start pulse for each mirror face.

6. The system of claim 5 wherein said scan start pulse is generated by electronics connected by an optical fiber to a fixed sensing position at the periphery of the mirror corresponding to a start angle position for each mirror face.

7. The system of claim 6 further comprising switching means to disconnect the optical fiber from said sensing position to said electronics, and to connect it instead to any one of the channel bundles of optical fibers leading from said light channeling surface to a particular photodiode, such that a scanning laser spot produced by said rotating mirror is picked up at said sensing position and conducted out through said channel bundle to focus a plurality of related stationary spots on a reference surface whereby said light receiving means may be aimed and focused with respect to said scanning beam.

8. The system of claim 6 further comprising means to generate a time value corresponding to a fixed beam end angle position for each mirror face.

9. The system of claim 6 wherein a leading edge of one of the mirror faces has been rendered non-reflective, and further comprising a lobe sensor fixed at a position on the periphery of the rotating mirror such that the scanning laser spot will strike said lobe sensor as it reflects from the leading edge of every mirror face except the one rendered non-reflective.

10. The system of claim 2 with the improvement further comprising:
dual light receiving means positioned at either end of said light emitting and guiding means, each said light receiving means comprised of substantially identical components.

11. A method of non-contact surface contour measurement using time based triangulation, comprising the steps of:
(1) Creating an optical scanning beam with a laser and a spinning polygonal mirror to define a line of reflection points on an object;
(2) Keeping track of the angle of the scanning beam by knowing the rotating speed of the mirror and by starting a timer when the beam passes a start sensor;
(3) Collecting the reflected image of said line with a lens system to focus said reflected line onto a light channeling surface comprised of the ends of multiple optical fibers for each of one or more light receiving channels, each channel feeding light to a single photoreceiver for generating an electrical signal related to the time of the entry of reflected laser light into said channel;
(4) Keeping track of said time of entry of said reflected light into said channel through a particular fiber and comparing that time value with one or more previously measured reference values of reflection times for that fiber to compute an actual surface height relative to a reference height for each reflection point.

12. The method of claim 11 wherein the previously measured reference time values of step 4 are contained in digitally stored look up tables for each of said fibers such that no range of time values for a fiber associated with a particular one of said light receiving channels overlaps the range of time values for another fiber also associated with that same channel.

* * * * *